Figure 1:
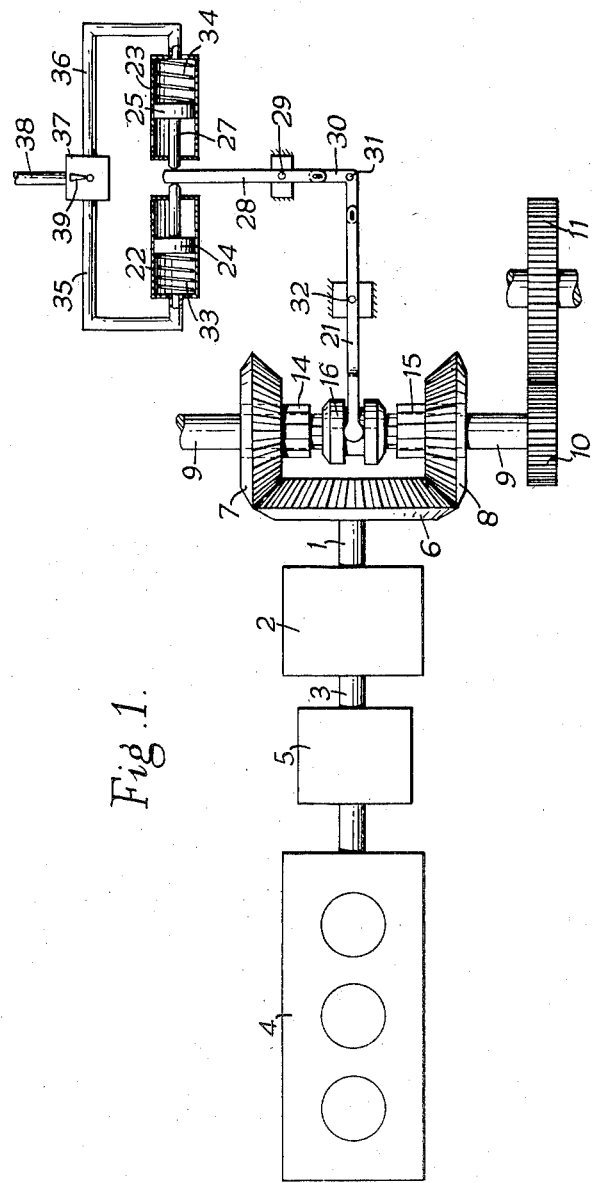

April 29, 1958  H. SINCLAIR  2,832,234
POWER TRANSMISSION MECHANISM INCORPORATING
FORWARD AND REVERSE GEARING
Filed June 21, 1955  2 Sheets-Sheet 1

INVENTOR
Harold Sinclair
BY
Benjamin Sweedler
ATTORNEY

INVENTOR
Harold Sinclair
BY
Benjamin Sweedler
ATTORNEY

United States Patent Office 2,832,234
Patented Apr. 29, 1958

2,832,234

POWER TRANSMISSION MECHANISM INCORPORATING FORWARD AND REVERSE GEARING

Harold Sinclair, Windsor, England

Application June 21, 1955, Serial No. 516,815

Claims priority, application Great Britain June 23, 1954

4 Claims. (Cl. 74—730)

This invention relates to power transmission mechanism incorporating forward and reverse gearing, and provided with dog clutches associated with said forward and reverse gearing and operable respectively for selectively connecting the driving member of the system to the driven member of the system for forward or reverse drive.

In conventional practice which has grown up from the use of friction clutches between engines and change gear mechanisms the co-acting ends of the dogs of the clutches in such systems are chamfered, the idea being that the engagement of the clutches is thereby facilitated since the chances of the co-acting ends of the dogs meeting apex-to-apex is remote. With such clutches, however, when the friction clutch is replaced by a hydro-kinetic transmitter as is becoming the practice in recent years notably in the higher powered transmissions, the chamfered ends of the dogs present a difficulty rather than a facility in the matter of engagement because the relatively heavier secondary parts and the relatively slower drive engaging and disengaging characteristics of a hydro-kinetic transmitter are very different from the corresponding features of a friction clutch. It is found that the dogs with chamfered ends are liable to engage incompletely, or on the other hand if some relative rotation is present the ends will engage heavily setting up undesirable shock loads, or they will grate noisily against each other causing wear or damage to the apexes or flanks of the chamfered ends.

In the case of a diesel locomotive with a mechanical change speed gearbox wherein the direction gear dog clutch is manually operated the driver can use some judgment in the operation of the controls to ameliorate these difficulties when engaging or changing the direction gear, with the locomotive stationary as it should be and the driven shaft system at rest. If the direction gear clutch is actuated by servo mechanism, e. g. pneumatic means, it is more difficult to avoid grating engagement and shock loads under some conditions.

Damage can occur if the direction gear dog clutch is operated to change direction when the driving and driven members are in motion, and the liability to incur damage is increased by the provision of chamfered ends to the dogs as is established practice. Various devices such as control interlocks have been used and proposed for preventing the driver of the vehicle from operating the forward and reverse dog clutches before the locomotive or railcar has come to a standstill, but such devices are not always reliable, and in general terms, control interlocks are to be avoided because they can disconcert the operator by interfering with the normal freedom of movement, or response, of the controls.

The presence or absence as the case may be of drag torque tending to cause rotation of the clutch system when the direction gear clutch is to be engaged or changed, affects the problem in a conflicting way. The term "drag torque" is commonly used to explain any tendency for the driving member of the forward and reverse gearing to rotate when the dog clutch is in neutral and the transmission is set in its neutral condition, i. e. is incapable of transmitting the power of the engine. This condition often arises when a turbo coupling of the constant filling type is used with a change speed gearbox, e. g. of the epicyclic type wherein there is a tendency for the output shaft to rotate due to oil drag internally even when the gear control means of the said change speed gearbox are set in "neutral." Similarly in the case where the hydrokinetic transmitter is of the scoop control type as commonly used with the S. S. S. Power Flow Gearbox (see patent specification No. 2,505,842) and it incorporates centrifugal valves that open at the idling speed of the engine, there is a light drag torque that is intentionally provided due to the working circuit being partially filled by the scoop being left in engagement when the direction gear dog clutch is being changed between forward and reverse gear without intentional pause in neutral. The scoop tube can be withdrawn when necessary e. g. to eliminate all drag torque in order to stop rotation of the driving member before engaging the direction gear dog clutch from its neutral position.

In the case in which the system incorporates a hydrokinetic transmitter of a type that provides no drag torque in the above sense when it is set in the neutral condition, the operation of the direction gear dog clutch between forward and reverse presents the difficulty that end abutting engagement of the clutch dogs occurs quite frequently, and the working circuit needs to be slightly engaged or the transmitter otherwise made operative (but not too much) to create sufficient drag torque to rotate the driving member slowly so that the dogs can be engaged.

A light drag torque is an advantage when changing the dog clutch between the forward and the reverse settings, since at the moment of passing through "neutral" the shaft rotates slightly and the chamfered ends of the dogs facilitate their interengagement. If the drag torque is however too high the ends of the contacting dogs will come into contact on the chamfered portions thus preventing the clutch from being moved fully into engagement. If the clutch is then moved into neutral in a further attempt to engage it the shaft will quickly commence to rotate and grating or shock engagement, or a further failure to engage, may result.

To summarise the foregoing, if there is no drag torque in the system it is difficult at times to engage the dogs, from neutral, and also when changing between forward and reverse engagement. If there is drag torque, there can be difficulty in changing between forward and reverse drive and also in engaging the dogs from neutral, since the driving member rotates and shock loads arise if the clutches are forced into engagement.

The principal object of the present invention is to overcome the foregoing several difficulties associated with the engagement of the drive from the neutral condition of the direction gear or the change over between forward and reverse drive in a power transmission system of one of the abovementioned kinds which may incorporate a hydro-kinetic transmitter and may or may not provide drag torque in the neutral condition of the system between the engine and the said forward and reverse gear.

Another object of the invention is to enable the direction change operation to be safely initiated without the operator necessarily having to ensure that the gears of the forward and reverse transmission system have come to a standstill.

According to the invention there is provided a power transmission system comprising a driving member and a driven member, forward and reverse gearing comprising dog clutches operable for selectively connecting said driving member to said driven member in forward or reverse sense, and the driving connection between said driving member and said dog clutches being capable of transmitting drag torque when in a nominally neutral condition, the co-acting faces of the dogs of said clutches being flat over substantially their whole width and lying respectively on a plane normal to the axis of rotation of the clutches, and wherein resilient means are provided for actuating said dog clutches.

According to the invention there is also provided a power transmission system comprising a driving member and a driven member, forward and reverse gearing comprising dog clutches operable for selectively connecting said driving member to said driven member in forward or reverse sense, and the driving connection between said driving member and said dog clutches incorporating a hydro-kinetic transmitter capable of being brought to a nominally neutral condition in which it provides drag torque, the co-acting faces of the dogs of said clutches being flat over substantially their whole width and lying respectively on a plane normal to the axis of rotation of the clutches, and wherein resilient means are provided for actuating said dog clutches.

The co-acting ends of the dogs preferably have their sharp corners rounded off with a very small radius, as is common practice with hardened gear and clutch teeth. Subject to this hardly perceptible radius the said ends are substantially flat, in contrast to the pronounced chamfers customarily provided.

By employing suitably resilient means for urging but not forcing the dog clutches to their engaged positions, and having flat-ended dogs on said clutches, engagement of either clutch can take place only when the co-acting parts thereof are stationary or almost stationary, and consequently if the reverse gear control is operated prematurely in the sense that relative rotation is present no damage to the dogs occurs, since instead of the co-acting dogs partially interengaging, the smooth flat ends of the dogs ride smoothly over one another until the rotation virtually ceases whereupon they quickly and fully engage.

If the co-acting parts of the dog clutch are stationary when engagement is initiated, and the co-acting parts are not in relative angular positions to permit their interengagement, the flat ends rest against one another under the action of the said resilient means so that when relative angular movement of said parts commences the dog clutch slips into full engagement.

The resilient means referred to above may be of any suitable form, for example a spring link between the movable clutch member and a clutch control lever. For remote control, however, a servo device may be employed acting through a spring link; conveniently a servo device which is pneumatic and itself has to effect of a spring link, In order that the invention may be clearly understood and readily carried into effect it will now be described in more detail with reference to the accompanying drawings in which Fig. 1 is a diagrammatic plan view, partly in section, of power transmission mechanism for a locomotive, Fig. 2 is a view in longitudinal section, on a larger scale, of the forward and reverse clutch mechanism, and Fig. 3 is a diagrammatic view in elevation of the splines of the forward and reverse mechanism.

Referring to Fig. 1 of the drawings, the driving member of the power transmission system comprises the output shaft 1 of change speed gearing 2, the input shaft 3 of which is coupled to an oil engine 4 through a turbo coupling 5 of any suitable known type that is capable of being set to a nominally neutral condition in which it provides drag torque as above-mentioned. On the shaft 1 is mounted a bevel pinion 6 the teeth of which engage continuously with the teeth of forward and reverse bevel gears 7 and 8 mounted for rotation about a shaft 9 the axis of which is normal to the axis of the shaft 1. The shaft 9 has mounted on it a pinion 10 the teeth of which engage continuously with the teeth of a gear wheel 11 coupled to the wheels of the locomotive. The shaft 9 constitutes the driven member of the power transmission mechanism of the invention.

Figure 2:
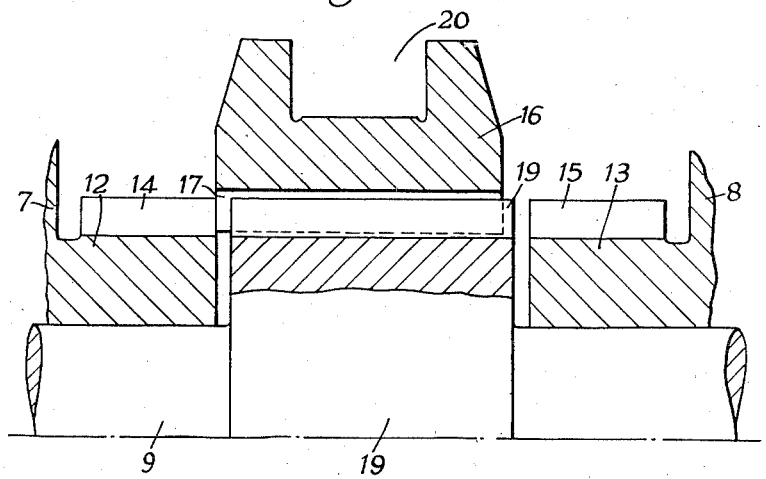
Figure 3:
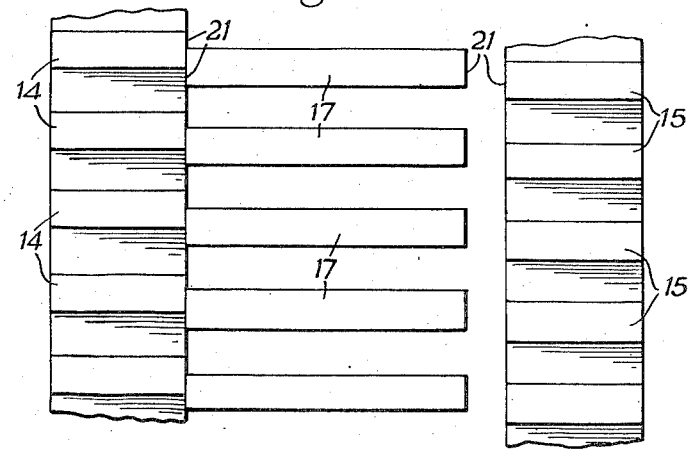

The forward bevel gear wheel 7 and reverse bevel gear wheel 8 are formed integrally with sleeves 12 and 13 respectively which are journalled on the shaft and which are formed with rings of external splines 14 and 15 respectively, spaced uniformly around the shaft (see Figs. 2 and 3). The two sleeves 12 and 13 are arranged so that the two rings of dogs face one another and are spaced from one another along the shaft 9 on which they are journalled. On the shaft 9 and between the two rings of splines 14 and 15 is mounted a clutch member 16 formed with internal straight splines 17 that engage with external splines on a flange 19 on the shaft 9, so that the clutch member 16 is capable of moving axially on the shaft 9 but is restrained from angular movement with respect to the shaft 9. The splines 17 within the clutch member 16 constitute clutch dogs which are proportioned suitably to engage with the splines 14 and 15 on the sleeves 12 and 13 respectively, to give forward and reverse drive. The clutch member 16 is formed with an annular groove 20 in which engages a control fork 21 under the action of which the clutch member 16 can be shifted axially on the shaft 9 so as to engage the internal dogs 17, the clutch member 16 selectively with the splines 14 or 15 of the forward or reverse drive bevel gears 7 and 8.

The arrangement described thus includes two dog clutches associated with the forward and reverse gearing, one of said dog clutches comprising the splines 17 in the clutch member 16 and the splines 14 associated with the forward level gear wheel 7, and the other dog clutch comprising the splines 17 in the clutch member 16 and the splines 15 associated with the reverse bevel gear wheel 8.

The arrangement as so far described conforms to conventional practice. In accordance with the invention, however, instead of the co-acting ends 21 of the splines of the dog clutches being chamfered with the intention of facilitating easy inter-engagement as is customary, and considered to be good practice in such gear clutches, they are substantially flat (see Fig. 3) the said ends lying in the case illustrated in planes which are normal to the axis of the clutches (i. e., the axis of the shaft 9).

In the example illustrated the resilient means for selectively engaging the dog clutches is constituted by pneumatic servo mechanism, comprising two air cylinders 22 and 23 in which are disposed pistons 24 and 25 provided with piston rods 26 and 27, the two piston rods 26 and 27 projecting out of their cylinders 22 and 23 towards and bearing on opposite sides of the lever 28. The cylinders 22 and 23 are connected by pipes 35 and 36 to a distributing valve 37 connected by a pipe 38 to a source (not shown) of compressed air, the valve 37 having a control lever 39 by means of which compressed air can be selectively admitted to or vented from the cylinders 22 and 23, in order to move the clutch member 16 into engagement with the splines 14 or 15 as desired, or to bring the lever 28 to the intermediate or neutral position shown in Fig. 1.

The lever 28 is pivotally mounted at 29 and is coupled, via a cranked lever 30 pivotally mounted at 31, to the fork 21, which is pivotally mounted at 32. The admission of air to one or other cylinder 22 or 23 causes the lever 28 to move angularly in one direction or the other so that the fork 21 shifts the clutch member 16 along the shaft 16.

When it is required to engage one dog clutch, say the forward clutch, when the clutch member 16 is in neutral position, air is admitted to the servo cylinder 22, so that lever 28 tends to move in the direction to engage the forward clutch. If at this time the mechanism is stationary, the forward clutch will engage only if the splines in the clutch member 16 happen to be disposed precisely opposite the gaps between the splines 14 associated with the forward bevel gear wheel 7. If the splines 17 are not disposed opposite the said gaps, their ends will abut the ends of the splines 14 (Figs. 2 and 3). Immediately after the forward bevel gear wheel 7 begins to turn slightly, e. g., due to light drag torque in the system, the splines 17 are able to slip into engagement with the dogs 14 and being free of bevelled ends they move into full engagement therewith, and the full torque of the turbo coupling 5 can be applied to drive the vehicle in the forward direction.

When it is required to change the direction gear, say from forward to reverse drive, with the engine 4 running but with the vehicle stationary and the turbo coupling 5 and gearbox 2 set to the nominally neutral condition (wherein a light drag torque is present) air is admitted to the servo cylinder 23 and vented from the cylinder 22 whereupon the lever 28 is moved in the direction to cause the splines 17 of the clutch member 16 to come out of engagement with the splines 14 and normally come into butting engagement with the dogs 15 associated with the reverse bevel gear wheel 8, whereupon, in consequence of the said drag torque, relative rotation occurs with the result that the splines 17 are able to slip into full engagement with the splines 15, as soon as they come opposite the gaps between the splines 15. If there is no drag torque in the system when the servo cylinder 23 is operated, the clutch member 16 will stop normally with its splines in butting engagement with the splines 15 until light drag torque is created in the system whereupon relative rotation between the splines 15 and 17 will occur and full engagement of these splines will be effected.

If the forward/reverse control lever 37 should be operated when the turbo coupling 5 has been set to the neutral condition and before the vehicle has come to a standstill (which is normally a hazardous condition in which to operate the direction gear dog clutch), the flat ended splines 17 in the clutch member 16 will abut the co-acting flat ended splines 14 or 15 of the clutch to be engaged, and since the sets of splines that are to inter-engage are rotating in opposite directions the relative angular movement will be so high that the two sets of dogs will slide smoothly over one another without jarring or risk of premature engagement, until the vehicle has virtually stopped, whereupon just when the clutch member 16 ceases to rotate due to frictional efforts, the splines 17 therein will slip quietly and safely into full engagement with the co-acting splines 14 or 15.

The position of the clutch member 16 may be readily indicated to the driver by remote indicator mechanism connected to the lever 28 to show whether the clutch member 16 is in neutral or in one or other of the fully engaged settings. Centering springs 33 and 34 may be provided within the servo cylinders 22 and 23 respectively to assist in setting the mechanism to a neutral position. The indicator assists the driver in bringing the clutch member 16 to a neutral setting by suitable manipulation of the distributing valve 37 with the turbo coupling 5 and gearbox 2 set to the neutral condition, and serves as a guide in operating the valve 37 which controls the supply of air to the cylinders 22 and 23.

I claim:

1. A power transmission system comprising a driving member and a driven member, forward and reverse gearing comprising dog clutches operable for selectively connecting said driving member to said driven member in forward or reverse sense, means in the driving connection between said driving member and said dog clutches for transmitting drag torque to said dog clutches when said dog clutches are in a nominally neutral condition, the co-acting faces of the dogs of said clutches being flat over substantially their whole width and lying on a plane normal to the axis of rotation of the clutches, and resilient means for actuating said dog clutches.

2. A power transmission system comprising a driving member and a driven member, forward and reverse gearing comprising dog clutches operable for selectively connecting said driving member to said driven member in forward or reverse sense, and the driving connection between said driving member and said dog clutches incorporating a hydro-kinetic transmitter capable of being brought to a nominally neutral condition in which it provides drag torque, the co-acting faces of the dogs of said clutches being flat over substantially their whole width and lying on a plane normal to the axis of rotation of the clutches, and wherein resilient means are provided for actuating said dog clutches.

3. A power transmission system according to claim 1, wherein the said resilient means comprise fluid pressure actuated means for actuating said clutches.

4. A power transmission system according to claim 2, wherein the said resilient means comprise fluid pressure actuated means for actuating said dog clutches.

References Cited in the file of this patent

UNITED STATES PATENTS

| | | |
|---|---|---|
| 2,180,154 | Lenz | Nov. 14, 1939 |
| 2,277,198 | Auer | Mar. 24, 1942 |
| 2,398,407 | Brownyer | Apr. 16, 1946 |